United States Patent [19]
Prugh

[11] 3,988,342
[45] Oct. 26, 1976

[54] PIPERIDYLIDENE DERIVATIVES OF CYANO-5H-DIBENZO[a,d]CYCLOHEPTENE

[75] Inventor: John D. Prugh, Chalfont, Pa.
[73] Assignee: Merck & Co., Inc., Rahway, N.J.
[22] Filed: June 5, 1974
[21] Appl. No.: 476,630

Related U.S. Application Data

[63] Continuation-in-part of Ser. No. 280,685, Aug. 14, 1972, Pat. No. 3,960,872, which is a continuation-in-part of Ser. No. 9,049, Feb. 5, 1970, abandoned, which is a continuation-in-part of Ser. No. 4,123, Jan. 19, 1970, abandoned.

[52] U.S. Cl. .......................... 260/293.62; 424/267
[51] Int. Cl.$^2$ ........................................ C07D 211/78
[58] Field of Search .............................. 260/293.62

[56] References Cited
UNITED STATES PATENTS 3,014,911   12/1961   Engelhardt .................. 260/293
3,511,881   5/1970    Hoffsommer et al. ........... 260/607
3,547,980   12/1970   Engelhardt et al. ............ 260/482

OTHER PUBLICATIONS

Migrdichian, "Organic Synthesis, vol. 1," Reinhold Publishing Corp., New York (1957), pp. 420–423.

Primary Examiner—G. Thomas Todd
Attorney, Agent, or Firm—Harry E. Westlake, Jr.; William H. Nicholson; James A. Arno

[57]   ABSTRACT

Disclosed are 1-, 2-, or 3-cyano-N-alkyl-5H-dibenzo[a,d]-cyclohepten-5-ylidene piperidine compounds having pharmaceutical utility as tranquilizers; also disclosed are processes for the preparation of such compounds; pharmaceutical compositions comprising such compounds; and methods of treatment comprising administering such compounds and compositions when a tranquilizing effect is indicated.

2 Claims, No Drawings

PIPERIDYLIDENE DERIVATIVES OF CYANO-5H-DIBENZO[a,d]CYCLOHEPTENE

This is a continuation-in-part of copending U.S. Ser. No. 280,685, filed Aug. 14, 1972, now U.S. Pat. No. 3,960,872 which application is a continuation-in-part of U.S. Ser. No. 9049, filed Feb. 5, 1970 and now abandoned, which in turn is a continuation-in-part of U.S. Ser. No. 4123, filed Jan. 19, 1970, and now abandoned.

SUMMARY

This invention concerns 1-alkyl-1, 2 or 3-cyano-5H-dibenzo[a,d]cyclohepten-5-ylidene)-piperidine compounds, acid addition salts thereof, and processes for the preparation of said compounds. It also concerns pharmaceutical compositions in which said 1, 2 or 3-cyano compounds are incorporated as the active medicinal agent. The compounds of the present invention are also useful as intermediates in the preparation of the corresponding 10-oxo or hydroxy compounds.

BACKGROUND

Allergic conditions in the past have been treated with a variety of drugs including those characterized as 1-alkyl-4-(5H-dibenzo[a,d]cyclohepten-5-ylidene)-piperidines.

Prior to the present invention, it was known that the compound cyproheptadine of the structure

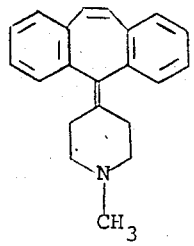

was an active antihistaminic and antiserotonin agent and was therefore useful in the treatment or relief of certain allergic conditions. This is disclosed in U.S. Pat. No. 3,014,911, Edward L. Engelhardt, which patent was issued Dec. 26, 1961.

The novel 1, 2 or 3-cyano compounds of the present invention are distinguished from the prior art patented compounds by their tranquillizing activity. In standard laboratory animals, the compounds of the present invention are found to have central nervous system activity characteristic of tranquillizing agents. Thus, in laboratory mice the compounds are shown to depress motor activity or in trained squirrel monkeys and rats behavioral evidence of tranquillizing activity of the compounds is observed.

DESCRIPTION OF THE PREFERRED EMBODIMENTS

The present invention relates to derivatives of 1-alkyl-4-(1, 2 or 3-cyano-5H-dibenzo[a,d]cyclohepten-5-ylidene)-piperidines which are useful as tranquillizing agents to be used for the treatment of neurotic and psychotic disorders and related symptomatology in human patients. In particular, the present invention relates to derivatives of the following structure:

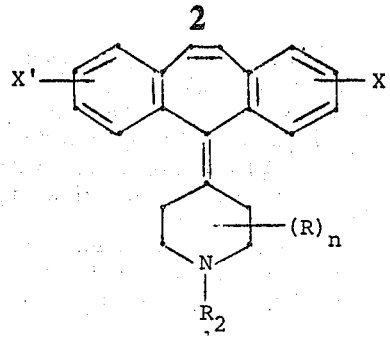

wherein
$R_2$ is hydrogen, loweralkyl of loweralkenyl, preferably containing from 1 to 6 carbon atoms;
R is methyl or ethyl and may replace one or more of the hydrogens in positions 2, 3, 5 or 6 of the piperidine ring, provided that only one of positions 3 or 5 is monosubstituted at one time;
n is 1 or 2;
X is cyano; and
X' is selected from hydrogen, and an alkyl group having up to 6 carbon atoms.

The invention also includes salts of the above compounds such as acid addition salts which may interchangeably be used in therapeutic applications with the base and likewise includes N-oxide derivatives thereof.

The invention also includes the administration of 1-alkyl-4-(1, 2, or 3-cyano-5H-dibenzo[a,d]cyclohepten-5-ylidene)-piperidine or an acid addition salt thereof as tranquillizers in the treatment of neurotic and psychotic conditions and related symptomatology in human patients. The treatment involves preferably the oral administration of an effective amount of the selected 1-alkyl-4-(1, 2 or 3-cyano-5H-dibenzo[a,d]cyclohepten-5-ylidene)-piperidine at a dosage level which will afford relief from the aforementioned conditions.

The compounds of the present invention may be administered to persons in any of the usual pharmaceutical oral forms such as tablets, elixirs and aqueous suspensions in an amount from 0.10 up to 1000 mgs. per dose given 2 to 4 times daily. Sterile solutions for injection containing from 0.001 to about 500 mgs. per dose are injected 2 to 4 times daily. Further, the compounds of this invention are ordinarily easily administered as a salt and any convenient non-toxic acid addition salt formed in a conventional manner may be employed. As examples of the salts convenient for use are salts of the compounds of the present invention with hydrochloric acid, sulfuric acid, phosphoric acid, acetic acid, propionic acid, citric acid, tartaric acid, succinic acid, maleic acid and the like. These salts are generally equivalent in potency to the bases from which they are formed taking into consideration the stoichiometric quantities employed.

The compounds of the present invention are conveniently prepared from the compounds disclosed in the Engelhardt patent U.S. Pat. No. 3,014,911, or from appropriately substituted 5H-dibenzo[a,d]cycloheptenones, in the manner described in Column 3 of that patent, the 5H-dibenzo[a,d]cyclohepten-5-one or a derivative containing an X and/or X' substituent in the benzene rings being treated with a Grignard reagent prepared from a 1-alkyl-4-halo piperidine or a ring alkylated 1-alkyl-4-halo piperidine to form an intermediate carbinol, a 5-(1-alkyl-4-piperidyl)-5H-dibenzo[a,d]cyclohepten-5-ol which is then dehydrated to produce the desired 1-alkyl-4-(5H-dibenzo[a,d]cyclohepten-5-ylidene)-piperidine, e.g., a 1-alkyl-4-(1, 2 or 3-cyano-5H-dibenzo[a,d]cyclohepten-5-ylidene)-piperidine and, if desired, in the case of the 1-methyl compound, demethylated to produce the corresponding 4-(1, 2 or 3-cyano-5H-dibenzo[a,d]cyclohepten-5-ylidene)-piperidine.

In an alternate method of preparation of the compounds of the present invention, a 1, 2 or 3-bromo-5H-dibenzo[a,d]cyclohepten-5-ylidene piperidine of the formula

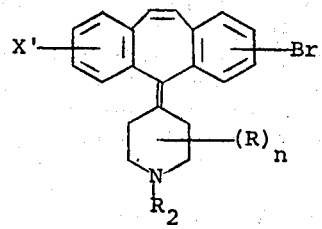

is treated with a metal cyanide, preferably cuprous cyanide, in an inert liquid reaction medium at an elevated temperature to produce the corresponding compound of the following formula, wherein the bromo substituent is replaced by a cyano substituent:

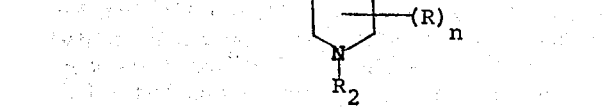

In the above formulae, R, $R_2$, X' and n are as defined hereinabove. In an illustrative example, a preferred modification is prepared by heating 1-methyl-4-(3-bromo-5H-dibenzo[a,d]cyclohepten-5-ylidene)-piperidine and cuprous cyanide in dimethylformamide at the reflux temperature. The resulting 1-methyl-4-(3-cyano-5H-dibenzo[a,d]cyclohepten-5-ylidene)-piperidine is active as a tranquillizer when tested in standard laboratory animal test models.

The compounds of this invention, in addition to their activity as tranquillizers, are useful as intermediates or starting materials in the process of preparing appropriately substituted 1-alkyl-4-(1, 2 or 3-cyano-5H-dibenzo[a,d]cycloheptene)-piperidine having a 10 or 11-keto or 10 or 11-hydroxy substituent as hereinafter described.

The process for using the compounds of the present invention in the preparation of other biologically active compounds is conveniently illustrated by the following process outline:

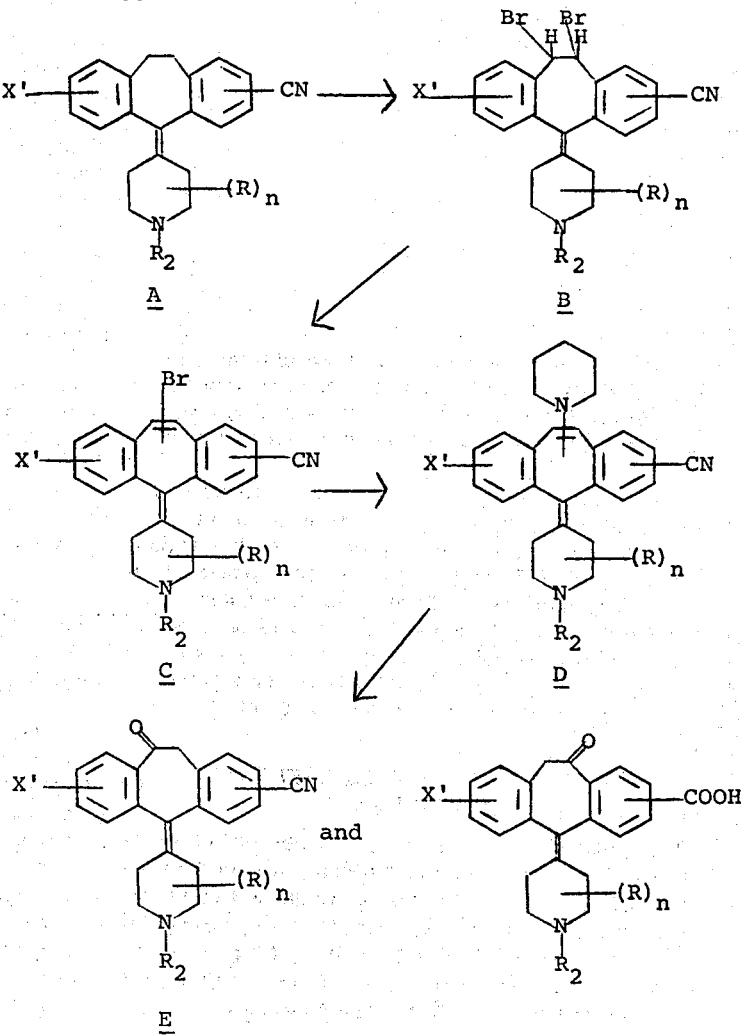

wherein
- R₂ is hydrogen, loweralkyl, or loweralkenyl, preferably containing from 1 to 6 carbon atoms;
- R is methyl or ethyl and may replace one or more of the hydrogens in positions 2, 3, 5 or 6 of the piperidine ring, provided that only one of positions 3 or 5 is monosubstituted at one time;
- n is 1 or 2; and
- X' is selected from hydrogen or an alkyl group having up to 6 carbon atoms.

The process outlined in the above flowsheet is a method of introducing a 10 or 11-oxygen substituent into Compound A, i.e., 1-alkyl-4-(1, 2 or 3-cyano-5H-dibenzo[a,d]cyclohepten-5-ylidene)-piperidine, by the process of bromination, dehydrobromination, enamine formation and hydrolysis. This process is also applicable to the derivatives indicated in which the benzene rings are substituted by one or more of the named substituents.

In the conversion of Compound B to Compound C wherein the starting compound is unsymmetrically substituted, e.g., X' is other than a cyano group, the product produced is a mixture of position isomers which differ in that the bromine substituent is present at either the 10- or 11- positions. This mixture is separated by conventional methods such as chromatography and crystallization to produce the respective 10-bromo or 11-bromo position isomers of Compound C. Each of these isomers, but preferably the mixture without further crystallization, is converted to the corresponding Compound D. This reaction is conducted by treatment of the mono-bromo derivative C with a strong base in the presence of piperidine to form the corresponding enamine Compound D. In this instance, as in the formation of the mono-bromo compound, the reaction gives rise in the case of the unsymmetrically substituted compounds to position isomers in which the N-piperidyl substituent in the isomer is present either in the 10- or 11- position. These position isomers are separated by conventional means such as by chromatography and/or crystallization. Preferably, the mixture of isomers, but alternatively either of the position isomers, is then converted to the corresponding 10-keto, 11-keto, or a mixture of the two isomeric compounds. This mixture of 10- and 11- keto compounds is also readily separated into the component isomers by conventional techniques such as by chromatography and/or crystallization.

It will be apparent to one skilled in the art that the compounds prepared in the above manner which are unsymmetrically substituted are usually obtained as a mixture of isomers. These isomers, i.e., the geometrical, stereo, and/or the optical isomers, can be separated at any desired stage of the process. In addition, the mixtures of isomers formed are readily subjected to the various processing steps with consequent production of a mixture of isomers of the final product which in turn may be readily separated by known means. The isomers prepared in the above manner when isolated in their pure form may differ in biological activity.

The 1, 2 or 3-cyano-5H-dibenzo[a,d]cyclohepten-5-ylidene piperidine compounds and especially 1-methyl-4-(3-cyano-5H-dibenzo[a,d]cyclohepten-5-ylidene)-piperidine are useful because of the fact that they possess tranquillizing activity.

In the following illustrative examples, the isolation procedures are modified depending on product properties in accordance with principles well known to any skilled chemist.

EXAMPLES SHOWING UTILITY OF COMPOUNDS OF THE PRESENT INVENTION AS INTERMEDIATES

EXAMPLE 1

1-Methyl-4-(5H-dibenzo[a,d]cyclohepten-5-ylidene)-piperidine hydrochloride, 50 g. (0.146 mole) is stirred while warming with 100 ml. of 20% NaOH solution and 200 ml. benzene until all of the salt is converted to the base and base dissolved in the benzene layer. The benzene layer containing the product is separated, washed, dried and evaporated under reduced pressure leaving the free base as a residue, which is dissolved in 500 ml. of ether. Dry hydrogen bromide gas is bubbled into the ether solution slowly with rapid stirring until no more precipitate is formed. This salt is collected and dried in a vacuum oven at 60° C. for 24 hours to give 1-methyl-4-(5H-dibenzo[a,d]cyclohepten-5-ylidene)-piperidine hydrobromide, m.p. 257°–258° C.

EXAMPLE 2

1-Methyl-4-(10,11-dibromo-10,11-dihydro-5H-dibenzo[a,d]cyclohepten-5-ylidene)-piperidine Hydrobromide 1-Methyl-4-(5H-dibenzo[a,d]cyclohepten-5-ylidene)-piperidine hydrobromide, 18.40 g. (0.05 mole) is dissolved with warming in 750 ml. of glacial acetic acid. This solution is cooled to room temperature and 8.0 g., 2.6 ml., (0.05 mole) of bromine dissolved in 75 ml. of glacial acetic acid is added dropwise with stirring. After completion of the addition the mixture is stirred overnight. The crystals are collected, washed with a small amount of cold glacial acetic acid, then with dry ether, and then dried for 2 hours in a vacuum oven at 70° C. to give 1-methyl-4-(10,11-dibromo-10,11-dihydro-5H-dibenzo[a,d]cyclohepten-5-ylidene)-piperidine hydrobromide. Recrystallization from acetonitrile gives an analytical sample, m.p. 185°–186° C.

Anal. Calcd. for $C_{21}H_{21}NBr_2 \cdot HBr$: C, 47.75; H, 4.20; N, 2.65.

Found: C, 47.80; H, 4.21; N, 2.61.

EXAMPLE 3

The procedure of Example 2 is repeated using a stoichiometrically equivalent amount of each of the following correspondingly substituted 1-methyl-4-(5H-dibenzo[a,d]cyclohepten-5-ylidene)-piperidines having the following structure:

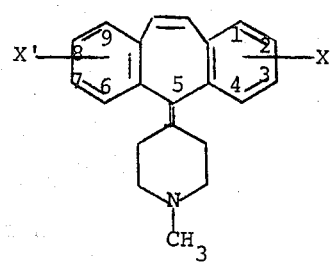

in which one or more of the hydrogens of the benzene rings is substituted by an X or an X' substituent as defined in the following table with resultant production of the corresponding 10,11-dibromo compound:

| X | X' |
|---|---|
| Compound 1, 1-Cyano | H |
| Compound 2, 3-Cyano | H |
| Compound 3, 2-Cyano | H |

EXAMPLE 4

The procedure of Example 3 is repeated using a compound in which the N-methylpiperidine substituent is replaced in each and every instance by each of the following substituents:
1. 1,2-dimethyl-piperidine
2. 1,2-diethyl-piperidine
3. 1,3-dimethyl-piperidine
4. 1,2,2-trimethyl-piperidine
5. 1,2,5-trimethyl-piperidine
6. 1,2,6-trimethyl-piperidine
7. 1-ethyl-2-methyl-piperidine
8. 1,2-diethyl-piperidine
9. 1-ethyl-3-methyl-piperidine
10. 1-ethyl-2,2-dimethyl-piperidine
11. 1-ethyl-2,5-dimethyl-piperidine
12. 1-ethyl-2,6-dimethyl-piperidine

EXAMPLE 5

1-Methyl-4-(10-bromo-5H-dibenzo[a,d]cyclohepten-5-ylidene)-piperidine

To 600 ml. of a 0.40 M (0.24 mole) solution of potassium t-butoxide in t-butanol is added 42.1 g. (0.079 mole) of 1-methyl-4-(10,11-dibromo-10,11-dihydro-5H-dibenzo[a,d]cyclohepten-5-ylidene)-piperidine hydrobromide and the mixture stirred vigorously under anhydrous conditions for 6 hours at room temperature. The reaction mixture is poured into 2 l. of water and extracted 3 times with 100 ml. each of benzene. The combined benzene extracts are dried over anhydrous $MgSO_4$, filtered, the $MgSO_4$ washed with benzene, and the benzene solution evaporated to dryness on a rotary evaporator. There remains 27.9 g. of crystalline product. This product is recrystallized by dissolving in 750 ml. of boiling hexane, filtered hot, the volume reduced to 200 ml. by boiling off hexane, seeding and allowing to crystallize. The crystals are collected and dried in a vacuum oven at 60° C. overnight to give 1-methyl-4-(10-bromo-5H-dibenzo[a,d]cyclohepten-5-ylidene)-diperidine; m.p. 127°–129° C. Three more recrystallizations from hexane give an analytical sample with m.p. 130°–131° C.

Anal. calcd. for $C_{21}H_{20}BrN$: C, 68.85; H, 5.69; N, 3.82; Br, 21.82. Found: C, 68.78; H, 5.45; N, 3.79; Br, 21.94.

EXAMPLE 6

The procedure of Example 5 is repeated using as starting materials each of the products obtained in accordance with the procedure of Examples 3 and 4, respectively, to produce the corresponding monobromo dibenzocycloheptene compound.

EXAMPLE 7

1-Methyl-4-(10-[1-piperidyl]-5H-dibenzo[a,d]cyclohepten-5-ylidene)-piperidine

1-Methyl-4-(10-bromo-5H-dibenzo[a,d]cyclohepten5-ylidene)-piperidine, 2.87 g. (0.0079 mole), 50 ml. of a 0.4M solution of potassium t-butoxide in t-butanol, and 20 ml. of dry piperidine is stirred and refluxed under anhydrous conditions for 6 hours. The reaction mixture is cooled and partitioned between 350 ml. of benzene and 50 ml. of water. The benzene layer is then extracted 5 more times with 50 ml. each of water. The benzene layer is then dried over anhydrous $MgSO_4$, filtered, and the benzene evaporated. This gives a single spot on t.l.c. and is used directly in the next step.

The product is crystallized from acetonitrile-methanol mixture. A sample sublimed for analysis has a m.p. of 71.5°–78° C.

Anal. calcd. for $C_{26}H_{30}N_2$: C, 84.28; H, 8.16; N, 7.56. Found: C, 83.85; H, 8.14; N, 7.50.

EXAMPLE 8

The procedure of Example 7 is repeated using as starting materials each of the products obtained according to Example 6 with resultant production of the corresponding 10-(1-piperidyl)-5H-dibenzo[a,d]cycloheptene compound.

EXAMPLE 9

1-Methyl-4-(10,11-dihydro-10-oxo-dibenzo[a,d]cyclohepten-5-ylidene)-piperidine

1-Methyl-4-(10-[1-piperidyl]-5H-dibenzo[a,d]cyclohepten-5-ylidene)-piperidine, 2.4 g., is refluxed for 4 hours with 100 ml. of 10% HCl in water and 50 ml. of methanol. The methanol is evaporated and the remaining oil and water is made basic with solid $NaHCO_3$ until no more $CO_2$ is evolved. It is then extracted three times with 50 ml. each of toluene, combined extracts dried over $MgSO_4$, filtered, and the toluene evaporated on a rotary evaporator leaving a residual product which crystallizes on standing. Three recrystallizations of this product from hexane give 1-methyl-4-(10,11-dihydro-10-oxo-dibenzo[a,d]cyclohepten-5-ylidene)-piperidine, m.p. 142°–143° C.

Anal. calcd. for $C_{21}H_{21}NO$: C, 83.13; H, 6.98; N, 4.62.
Found: C, 82.96; H, 6.80; N, 4.72.

EXAMPLE 10

The procedure of Example 9 is repeated using as the starting materials each of the products obtained in accordance with Example 8 with resultant production of the corresponding 10,11-dihydro-10-oxo-dibenzo[a,d]cycloheptene compound.

ALTERNATIVE PREPARATION OF COMPOUNDS OF PRESENT INVENTION

EXAMPLE 11

1-Methyl-4-(3-cyano-5H-dibenzo[a,d]cyclohepten-5-ylidene)-piperidine

1-Methyl-4-(3-bromo-5H-dibenzo[a,d]cyclohepten-5-ylidene)-piperidine (3.33 g., 9 mmoles) and cuprous cyanide (1.25 g., 14 mmoles) are refluxed in 20 ml. of dry dimethylformamide for 6 hours. The reaction is then poured while hot into 50 ml. of water. To this is added 50 ml. of a saturated solution of sodium cyanide and 25 ml. each of benzene and ether. After vigorous shaking the organic layer is separated and the aqueous layer extracted with ether. The combined organic extracts are dried over anhydrous magnesium sulfate, filtered, and the solvent evaporated in vacuo to leave an oil which when crystallized from acetonitrile gives 1.5 g. of 1-methyl-4-(3-cyano-5H-dibenzo[a,d]cyclohepten-5-ylidene)-piperidine, m.p. 140°–124° C. The sample is further purified by chromatography on 140 g. of silica gel made basic with chloroform saturated with ammonia and water, eluting with chloroform saturated with ammonia and water, then crystallized from ethyl acetate to give an analytical sample, m.p. 141°–146° C.

Calcd. for $C_{22}H_{20}N_2$: C, 84.58; H, 6.45; N, 8.97.
Found: C, 84.59; H, 6.56; N, 8.89.

EXAMPLE 12

REPRESENTATIVE PHARMACEUTICAL COMPOSITION PREPARATION

A typical tablet containing 1 mg. of 1-methyl-4-(3-cyano-5H-dibenzo[a,d]cyclohepten-5-ylidene)-piperidine per tablet is prepared by mixing together with the active ingredient calcium phosphate dibasic, lactose and starch in the amounts shown in the table below. After these ingredients are thoroughly mixed, the appropriate amount of magnesium stearate is added and the dry mixture blended for an additional three minutes. This mixture is then compressed into tablets weighing approximately 124 mgs. each.

| TABLET FORMULA | |
|---|---|
| INGREDIENT | MGS. PER TABLET |
| 1-Methyl-4-(3-cyano-5H-dibenzo[a,d]cyclohepten-5-ylidene)-piperidine | 1 |
| Calcium phosphate dibasic | 52 |
| Lactose | 60 |
| Starch | 10 |
| Magnesium stearate | 1 |
| TOTAL | 124 mg. |

Capsules for oral use each containing 1 mg. of 1-methyl-4-(3-cyano-5H-dibenzo[a,d]cyclohepten-5-ylidene)-piperidine are prepared by blending 1 gram of 1-methyl-4-(3-cyano-5H-dibenzo[a,d]cyclohepten-5-ylidene)-piperidine with 287 grams of lactose, U.S.P. 4.1 grams of magnesium stearate. This is then used to fill 1000 capsules each containing 1 mg. of 1-methyl-4-(3-cyano-5H-dibenzo[a,d]cyclohepten-5-ylidene)-piperidine.

What is claimed is:

1. A 5H-dibenzo[a,d]cycloheptene compound of the formula

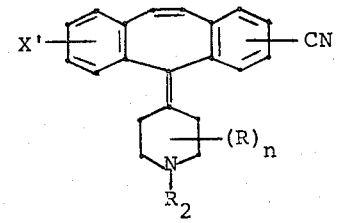

wherein the CN substituent is in the 1-, 2-, or 3-position;
$R_2$ is lower alkyl or a lower alkenyl substituent;
R is methyl or ethyl and replaces one or more of the hydrogens in positions 2, 3, 5 or 6 of the piperidine ring, provided that only of the positions 3 and 5 is substituted in any one compound;
n is 0, 1 or 2; and
X' is selected from hydrogen and an alkyl group having up to 6 carbon atoms.

2. A compound according to claim 1 of the formula

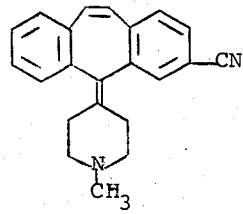

* * * * *